United States Patent Office 3,307,826
Patented Mar. 7, 1967

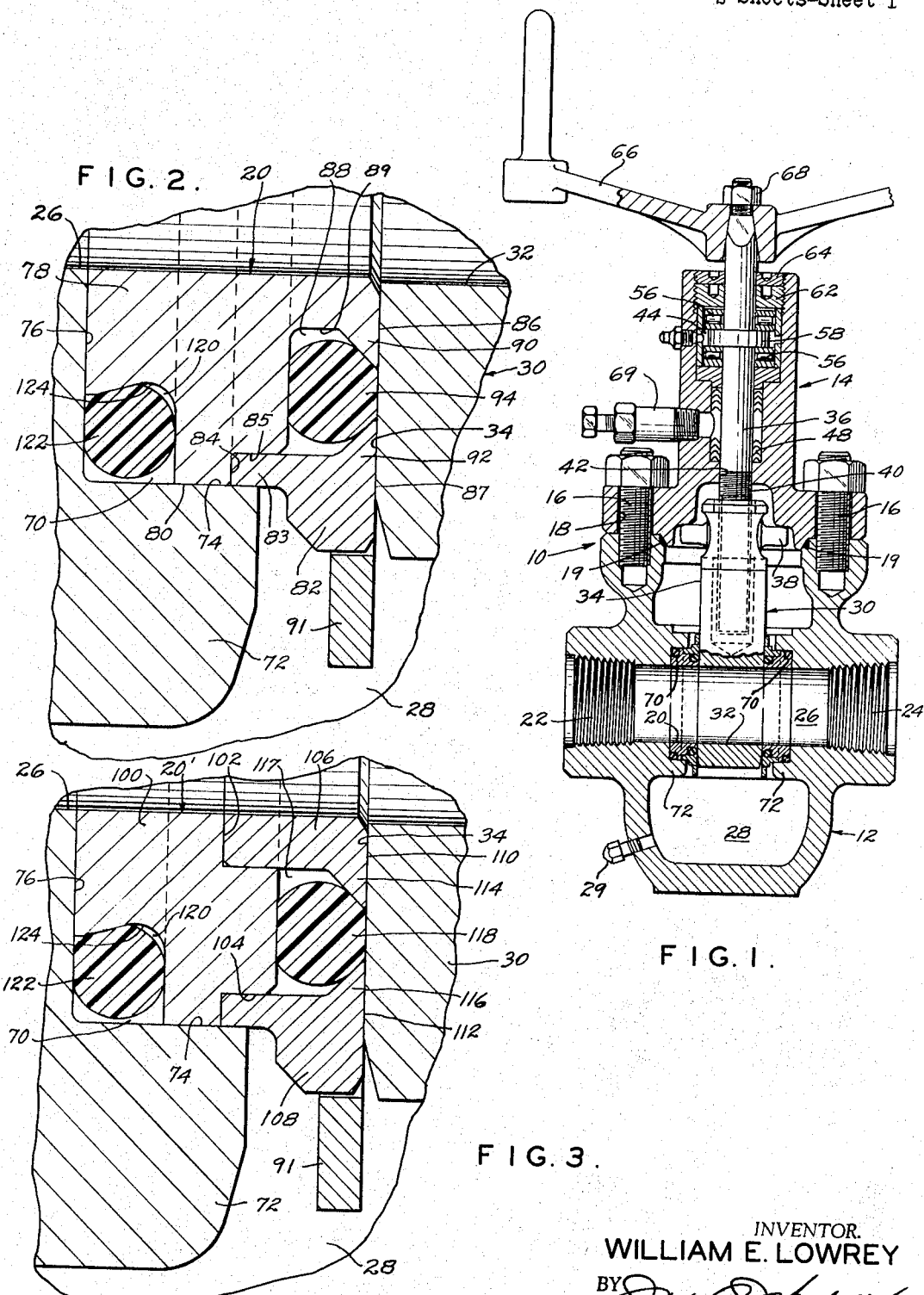

3,307,826
BIFACED GATE VALVE
William E. Lowrey, Houston, Tex., assignor to ACF Industries, Incorporated, New York, N.Y., a corporation of New Jersey
Filed Dec. 2, 1963, Ser. No. 327,301
1 Claim. (Cl. 251—327)

This invention relates generally to valves, and particularly to a through conduit gate valve, having a slab gate member incorporating seat members which form a seal both upstream and downstream.

Gate valves, particularly through conduit gate valves, which when opened present an unbroken smooth wall conduit for uninterrupted passage of flow therethrough, are widely used because of their desirable flow characteristics. When in the open position, the straight through passage, which is provided, offers no more appreciable resistance to fluid flow than an equal length of pipe. Although good flow characteristics are important, an even more important aspect of any valve is its ability to seal. While in certain installations it is only necessary for a valve to stop flow from passing out of the downstream side, there are other installations where it is necessary that the valve stops flow on the upstream side also, thereby blocking flow from entering the valve chamber. An upstream seal is also necessary for block and bleed service, i.e., service where the valve chamber can be bled to indicate leakage past either seat.

In through conduit gate valves, line pressure aids in establishing a seal at the downstream side by forcing the gate into intimate contact with the downstream seat member. Generally speaking, since pressure at the same time tends to move the gate away from the upstream seat, it is more difficult to establish an upstream seal. One method of obtaining effective downstream and upstream seals for gate valves has been to provide means whereby the gate member is mechanically forced into sealing engagement with both the upstream and downstream seats. While such valves provide an effective seal, they are fairly expensive to manufacture inasmuch as they require mechanism to expand the gate the necessary amount to obtain a tight seal in the closed position and also mechanism to retract or collapse a gate when it is being moved toward the open position. Another deterent in establishing effective seals is that it is inherently difficult to establish a bubble-tight seal between two metal surfaces. Several means have been used to alleviate this condition, one has been to inject a heavy viscous lubricant or packing material between the two surfaces which will aid in establishing the seal. However, where packing material is essential to the establishment of a seal, the necessary constant maintenance to see that the valve is properly lubricated is time consuming and expensive.

It is, therefore, an object of the present invention to provide a novel through conduit slab gate valve having pressure activated seat assemblies, each provided with an elastomer sealing member for sealing contact with the sealing surface of the valve.

It is an object of this invention to provide a novel through conduit gate valve having a slab gate and pressure activated sealing members wherein an elastomer sealing member is retained by each of the sealing members in such a manner as to prevent line suction and pressures from forcing the sealing member from the seats.

A further object of this invention contemplates the provision of a novel through conduit slab gate valve having pressure activated seats having portions thereof which are urged into sealing engagement with the gate member when the valve chamber pressure of the valve equals the line pressure.

It is another object of this invention to provide a novel through conduit gate valve having a slab gate member and pressure activated seat members wherein excessive valve chamber pressure will be vented into the upstream line.

A further object of this invention contemplates the provision of a novel through conduit slab gate valve having pressure activated seats which establish an upstream seal from either direction regardless of the direction of line flow.

Other and further objects of the invention will be obvious upon an understanding of the illustrative embodiments about to be described, or will be indicated in the appended claims, and various advantages not referred to herein will occur to one skilled in the art upon employment of the invention in practice.

Preferred embodiments of the invention have been chosen for the purpose of illustration and description and are shown in the accompanying drawings, forming a part of the specification, wherein:

FIGURE 1 is a sectional view illustrating a gate valve in accordance with the present invention.

FIGURE 2 is a partial sectional view illustrating the seat member of the valve of FIGURE 1.

FIGURE 3 is a partial sectional view illustrating an alternate form of seat member.

Figure 4:
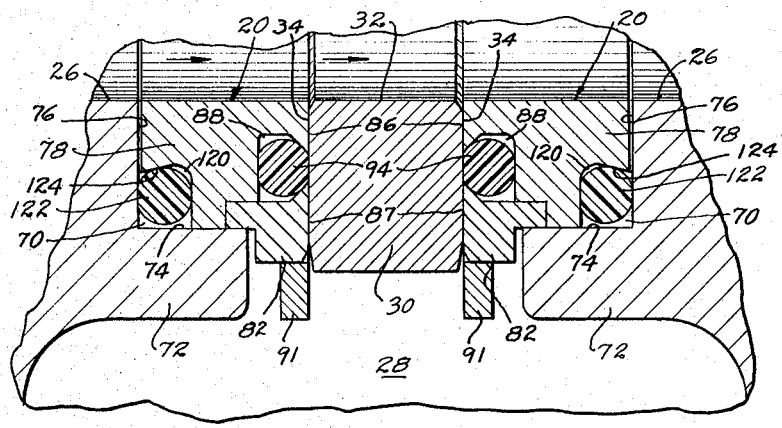
FIGURE 4 is a partial sectional view illustrating action of the seat members of FIGURE 1 in the open position of the gate.

Briefly, a through conduit slab gate valve, in accordance with the present invention, includes pressure actuated seat members which utilize the forces of line pressure to provide an effective seal both upstream and downstream of the gate.

Referring now to the drawing for a better understanding of the invention, there is illustrated in FIGURE 1 a through conduit slab gate valve 10, which is comprised of a valve body assembly 12 and a bonnet assembly 14. The bonnet assembly is fixed to the upper portion of the valve body by a series of bolts 16 which are threaded into the body and which extend through openings 18 in the bonnet 14. A seal ring 19 is positioned between the body and bonnet to establish a fluid-tight seal therebetween. The valve body 12 is provided with through ports 22 and 24 which define a bore 26 and which may be welded, flanged, threaded or otherwise attached to a pipe system for which the valve control is desired. Intersecting the bore 26 is a valve chamber 28 in which is positioned a reciprocating slab gate valve member 30. The valve member 30 consists of a substantially flat metal plate having a passage 32 which is adapted to register with the bore 26 to provide a continuous flow path in the open position and a solid portion 34 which blocks the bore 26 in the closed position. The passage 32 in registering with the bore 26 forms an unbroken smooth walled conduit for the uninterrupted passage of flow therethrough which offers no more appreciable resistance to flow than an equal length of equal diameter pipe.

The upper end of the gate member 30 is attached to means, such as the stem 36, for raising and lowering the gate. As illustrated in FIGURE 1, an internally threaded drive nut 38 may be provided for operation of the gate member 30. The drive nut 38 is retained by the upper portion of the gate and coacts with threads 40 on the stem 36 to effect reciprocation of the gate member 30. The attachment between the stem and gate may be fixed or rigidly connected and vertical stem movement may be effected by a handwheel which threadedly receives the upper portion of the stem as illustrated in the U.S. Patent No. 3,057,595 of McKinney. Obviously, any one of the numerous well known manual or power operated means of achieving vertical stem reciprocation may be employed without departing from the scope of this invention.

As mentioned above, the bonnet assembly 14 forms a closure for the valve chamber 28 and is provided with a bore 42 through which the stem 36 passes and a chamber 44 for retaining a packing and bearing assembly. Thrust bearings 56 are positioned about the stem 36 on either side of an enlarged diameter portion 58 of the stem 36 and serve to retain the stem against vertical movement as well as reducing the torque required to rotate the stem. Correct positioning of the thrust bearings 56 is maintained by adjusting and locking nuts 62 and 64 respectively which are threaded into the chamber 44. A hand-wheel 66 is retained on the upper extremity of the stem 36 by a handwheel nut 68 and is adapted to be grasped by the operator to produce rotation of the stem 36 for operation of the valve gate 30. Sealing about the stem 36 is achieved by forcing semisolid sealing material into the chamber 44 below the bearing assembly by means of a packing fitting assembly 69.

In accordance with a feature of this invention, valve seats are provided for both the upstream and downstream sides of the gate and in general, the valve seats retain an elastomer seal in position to be engaged by the planar sealing surface 34 of the gate 30 to establish a fluid-tight seal. More specifically, as illustrated in FIGURE 2, the valve body 12 is formed with facing cylindrical recesses 70 on internal bosses 72 thereof. The recesses 70 are concentric with the bore 26 and are defined by annular surfaces 74 and 76.

A seat assembly 20 is positioned in each of the recesses 70 and is in sliding engagement with the circumferential surfaces 74. Each seat assembly 20 (FIGURE 2) is composed of a seat portion 78 of metal or other suitable substance having an outer annular surface 80 of slightly smaller diameter than the diameter of the annular surface 74 so that a sliding engagement may be established between the ring 78 and the surface 74. As illustrated in FIGURE 2, a seal retaining portion 82 having a larger outside diameter portion than the seat portion 78 has an axial flange portion 83 thereof tightly press-fitted over a reduced diameter portion 85 of the seat member 78 and in engagement with an annular abutment 84 so that the two rings are normally retained as a unit but may be forcibly separated to replace the seal member. While the seat member and retainer member of the seats are tightly fitted together, field repair of the seats is nevertheless easily accomplished. The annular members are separated simply by supporting the seat member and applying an axial force to remove the retainer member. After the annular seat members 76 and 82 have been cleaned and the elastomer sealing member replaced, the annular members 76 and 82 are readily reassembled by pressing the axial flange portion over the reduced diameter surface 85. Disassembly and reassembly of the seats may be accomplished by utilizing the simplest field repair tools and equipment. Face sealing surfaces 86 and 87 formed on the rings 78 and 82 respectively are simultaneously surface ground in assembly so that the total sealing face of the unit is coplanar and evenly distributes the bearing load of the gate.

The ring members 78 and 82 cooperate to form a sealing ring retaining recess 88 having a restricted annular opening defined by the radially spaced seal retaining lips 90 and 92. A sealing member 94 which may be formed of an elastomer material such as natural rubber or any one of a number of synthetic rubber-like materials such as Butadiene Rubber, Styrene, Neoprene, etc., or of other plastic materials depending upon the line pressures for which the valve is designed and the lading to be controlled, is positioned within the groove 88 and is retained in position by the annular lips 90 and 92. The annular sealing members for the face and back face of the seats are illustrated as being O-rings but the cross sectional shape thereof may be of many shapes other than the circular shape illustrated. For instance, the cross sectional shape of the sealing members may be generally triangular, square or elliptical, etc.

The axial depth of the groove 88 from face 86 is less than the cross sectional diameter of the sealing ring 94 and the lip members 90 and 92 are radially spaced to define an annular restricted opening, and cooperate to cause a portion of the annular surface of the elastomer ring 94 to protrude beyond the face sealing surfaces 86 and 87 when the seat unit 20 is not installed. The radial spacing of the lip members 90 and 92 is considerably less than the radial cross sectional width of the ring member 94 and prevents fluid under line pressure from forcing the ring member out of the groove 88 where it may be sheared or otherwise damaged by the gate 30 as the valve is opened or closed. The lip members 90 and 92, because they bear upon the sealing member, maintaining the sealing member in compression, establish a fluid tight seal with the sealing member, effectively preventing the introduction of pressurized fluid in the groove behind the sealing member. The annular sealing member, because of its dimension relative to the groove dimension and because of the bias applied thereto by the lips 90 and 92, is effectively maintained in a central position within the annular groove and is prevented from moving out of sealing engagement with the gate.

The groove 88, defined by the radial spacing of the retainer member 82 from a reduced diameter surface 89 of the seat member 78, is considerably larger than the radial cross sectional width of the ring member 94 thus allowing for swelling of the ring member due to the chemical action of the lading with the material of the ring member, allowing for displacement of the ring member entirely into the groove 88, as the surface 34 of the gate 30 moves into contact with the coplanar sealing surfaces 86 and 87 of the seat 78, and also allowing for radial movement of the elastomer ring member under actuation by the pressurized lading. The annular groove, however, is not sufficiently large to allow the sealing member to move out of sealing engagement with the sealing surface of the gate in response to fluid pressure within the valve. It is contemplated that the size of the groove relative to the size of the sealing member only be sufficient to allow for slight swelling of the sealing member and to provide ample space for the entire sealing member in the event the gate is forced into metal to metal contact with the seats as shown in FIGURE 2.

A modified form of the invention is illustrated in FIGURE 3, wherein a valve of the type illustrated in FIGURE 1 is provided with an annular seat 100 which is slidably fitted within the annular seat recess defined in the valve body by the axial surface 74 and the radial surface 76. The annular seat member 100 is formed with an inner undercut portion defining an annular surface 102 and with an outer reduced diameter portion defining an annular surface 104. An inner annular retainer member 106 is tightly press-fitted within the annular surface 102 and an outer retainer member 108 has an axial flange portion thereof tightly press-fitted over the annular surface 104 in the same manner as was discussed above in regard to the retainer member 82 in FIGURE 2. The inner retainer member 106 and the outer retainer member 108 may be forcibly separated from the seat portion 100 for replacement of an annular elastomer sealing member, to be described below. Replacement of the sealing members may be accomplished in the field by a valve repairman using the simplest of tools and equipment. Cost of replacing the sealing member is quite low compared to replacement of entire seat assemblies in some types of valves.

The face sealing surfaces 110 and 112 on the inner and outer retainer members, respectively, are formed by surface grinding with the seat 20' in its assembled condition. This results in coplanar surfaces which insures accurate alignment with sealing surface 34 of the gate 30 and evenly distributes the load of the gate to the seat 20' when the seat is employed as a downstream seat.

Figure 5:
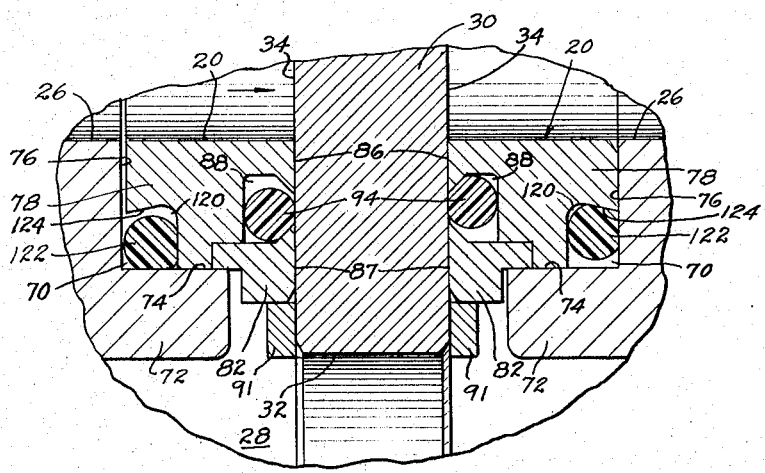
FIGURE 5 is a partial sectional view illustrating the position of the seats of the valve of FIGURE 1 when the gate is in its closed position.
Figure 6:
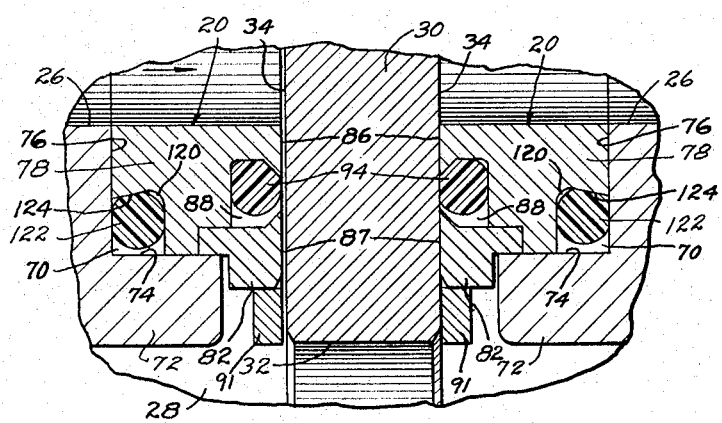
FIGURE 6 is a partial sectional view of the valve of FIGURE 1 illustrating the action of the seat members when excessive body pressure is vented.

The inner and outer retainer rings are radially spaced to define an annular groove 117 for retaining an annular sealing member 118. The radial width of the groove 117 is considerably wider than the radial cross sectional width of the sealing memebr 118, thus allowing the sealing member 117 to move either radially inwardly or radially outwardly. The axial depth of the annular groove 117 from the face surfaces 110 and 112 is substantially smaller than the axial cross sectional width of the sealing member 118, thus causing an annular portion of the sealing member 118 to protrude radially beyond the coplanar surfaces 110 and 112 and into sealing engagement with the sealing surface 34 of the gate 30 when the gate is spaced from the surfaces 110 and 112 of the seat 20'. The radial dimension of the groove 117 allows for swelling of the sealing member due to chemical action of the lading on the sealing member. The radial groove dimension also allows for displacement of the sealing member 118 entirely into the annular groove 117 when the surface 34 of the gate 30 is forced into sealing contact with the coplanar surfaces 110 and 112 of the seat member (FIGS. 2–6) as well as allowing radial displacement of the sealing member 118 under the influence of fluid under line pressure (FIGS. 5 and 6).

As illustrated in FIGURE 3, facing annular sealing member retainer lips 114 and 116 are formed respectively on the annular retainer members 106 and 108. The lips 114 and 116 are radially spaced a distance substantially less than the radial cross sectional width of the annular sealing member 118 and serve to prevent the sealing member from being pulled from the groove 117 when the gate 30 is being opened or closed under pressure.

In accordance with another feature of this invention, as illustrated in FIGURES 2 and 3, an annular chamber 120 is formed in the axially outer face of the seat rings 78 and 100 and cooperates with the surfaces defining the seat recesses 70 to form annular chambers for retaining O-ring type back face sealing members 122. The axial depth of the annular groove 120 is less than the cross sectional diameter of the annular back face sealing member 122 causing the member 122 to be continually under axial compression so that a back face seal is continually maintained by sealing engagement between the annular member 122 and the surface 76 and a face seal is continually established by sealing engagement between the sealing member 118 and surface 34 of the gate 30. The radial depth of the groove 120 defined by the radial spacing of the retainer members 106 and 108 is greater than the cross sectional width of the back face sealing member 122, thus allowing radial movement of the back face sealing member 122 in response to varying pressure conditions in the valve body.

The inner annular reduced diameter surface 124 defining the annular groove 120 in each of the modifications (FIGURES 2 and 3) so positioned relative to the groove 88 (FIGURE 2) 117 (FIGURE 3) that the back face sealing member 122 is always positioned radially outside the face sealing member 94 in FIGURE 2 and 118 in FIGURE 3. Positioning the back face sealing member radially outside the face sealing member serves to establish a greater back face area of the seat member than face seal area of the seat in contact with the lading under line pressure. The back face seal area is defined by the radial distance from the bore 26 to the annular line of sealing contact between the back face sealing member 122 and the radial surface 76 and the face seal area is defined as that portion of the valve seat 20–20' between the bore 26 and the annular line of sealing contact between the face sealing member 94 (FIGURE 2) and 118 (FIGURE 3) and the sealing surface 34 of the gate 30. Equal pressure (line pressure) against the larger back face seat area establishes a force differential which causes the upstream seat member (left FIGURE 5) to move into sealing contact with the gate member 30. The back face sealing member 122 must be placed radially outside the face sealing member under all conditions of valve operation in order for a force differential to exist and cause the upstream seat to be pressure actuated into sealing contact with the gate member 30.

A gate guide member 91 which forms no part of this invention is positioned about the exterior diameter of the outer retainer member and serves only to retain the passage 32 of the gate member 30 in alignment with the bore 26 of the valve.

Operation of the seat members is as follows: As illustrated in FIGURE 4, the valve is in its open position with the through passage 32 of the gate 30 aligned with the bore 26, the seats of the valve in their balanced condition and with the pressure within the valve chamber 28 being equal or substantially equal to line pressure. Under this condition there would be no force differential and each of the seats would be spaced from the surfaces 76 of the seat recess 70 due to axial expansion of the back face sealing members 122. The coplanar surfaces 86 and 87 will lightly engage the surface 34 as illustrated in FIGURE 1, or due to axial expansion of the face sealing member 94 the coplanar surfaces 86 and 87 may be slightly spaced from the surface 34 of the gate 30 and the sealing member 94 will have an annular portion protruding axially beyond the surfaces 86 and 87 and into sealing engagement with the surface 34 of the gate 30.

With the valve in its open condition, as illustrated in FIGURE 4, and with less pressure in the valve chamber 28 than in the line, a force differential would exist on both the upstream and downstream seats due to the greater back face area than face area of the seats 20 causing the seats to be pressure actuated or forced by the lading under line pressure into tight sealing engagement with the gate 30. The coplanar sealing surfaces 86 and 87 of the seats 20 would be in engagement with the sealing surface 34 of the gate 30 and the face sealing member 94 would be entirely forced into its respective groove 88. Lower valve chamber pressures might exist if the valve was in its open condition when flow through the line was begun or when the chamber is bled to indicate leakage past either seat. The latter is a method of testing the valve without dismantling it and without disturbing flow therethrough to determine whether the seats are in good condition. This test is generally known in the valve industry as "Block and Bleed Service." With the valve either open or closed the fluid in the valve chamber 28 under line pressure is bled off through a bleed port 29 (FIGURE 1). If the flow of fluid under pressure through the bleed port 29 does not subside after being open a short while, it is an indication that the seats are not sealing properly and the valve must be repaired or replaced. Utilizing the invention, normally repair would consist of replacing the face sealing member 94 and the back face sealing member 122 which may be done easily, quickly and without excessive repair costs since only the low cost ring sealing members 94 and 122 need be replaced.

When the valve is in its closed condition (FIGURE 5) and under line pressure, the force of the lading under pressure will force the gate member 30 downstream (right) and the gate will in turn force the downstream seat (right) to its maximum downstream position. The seat member will engage the radial surface 76 of the recess 70, thus compressing the back face sealing member 122 to its maximum amount of radial compression and the gate member 30 will engage the coplanar surfaces 86 and 87 thus compressing the face sealing member 94 (right) entirely within the annular groove 88. When the line pressure is above the valve chamber pressure the upstream seat (FIGURE 5 left) will be pressure actuated in a downstream direction by the force differential established between the face and back face areas of the seat member 20, as described above. The surface 86 and 87 will engage the sealing surface 34 of the gate 30 and the upstream face sealing member 94 (left) will be completely displaced into the annular groove 88. The upstream back face sealing member 122 (left) will be forced radially outwardly into very tight sealing engagement with the annular surface 74 and axially into tight sealing engagement with the seat member 78 by the lading under line pressure. If the valve chamber pressure equals the line pressure, which is not an uncommon occurrence, there will be no force differential produced to pressure actuate the upstream seat (left FIGURE 5) and the upstream seat will be relaxed as described above in regard to FIGURE 4. The gate 30 and the downstream seat 20 (FIGURE 5 right) would remain in the condition as illustrated in FIGURE 5 because of the pressure drop in the line below the gate 30.

As illustrated in FIGURE 6, the gate member 30 is in its closed position and body pressure has risen to a pressure above line pressure and the upstream seat (left) has been pressure actuated in an upstream direction by the fluid under body pressure to allow the fluid to escape between the upstream face sealing member 94 and the gate 30 into the upstream line. This is a safety feature incorporated into the invention to prevent damage to the valve mechanism or even rupture of the valve body due to excessive valve chamber pressure. Valve chamber pressure is caused by expansion of liquid trapped within the valve chamber when the liquid becomes heated by high ambient temperatures or from heat caused by a fire, etc., and especially when volatile ladings such as Butane, Propane, or even more exotic petroleum or chemical ladings are handled under high ambient temperatures. If the excessive valve chamber pressure is not relieved it is possible that the pressure could build very rapidly to a high enough level to destroy the valve. In the invention, when the chamber pressure is below line pressure, the seat arrangement is as shown and as described above in regard to FIGURE 5. As the valve chamber pressure builds to a level equal to line pressure the upstream seat will become balanced and will relax since the force differential between the face and back face of the seat no longer exists because there is equal pressure on each side of each upstream sealing member. As chamber pressure increases to a level above line pressure, due to high ambient temperatures, as described above, a force differential will become existant and will be greater at the face portion than at the back face portion of the seat 20 and will force the upstream seat (left) in an upstream direction (left) and will allow the excessive pressure to bleed between the upstream seat (left) and the upstream side of the gate 30 into the upstream line. The greater face seal area under this condition is defined by the area of the face of the seat 20 from the outer circumference of the retainer member 82 to the annular line of sealing contact between the sealing member 94 and the sealing surface 34 of the gate. The back face sealing area is defined as the effective radial area between the outer circumference of the annular line of sealing contact established between the back face sealing member 122 and the surface 76 of the recess 70. Since the chamber pressure bleeds into the upstream line when the chamber pressure exceeds the line pressure the maximum body pressure which will be allowed to exist will be only slightly above line pressure.

In case of deterioration of the elastomer face and back face sealing member 94 and 122 respectively in FIGURES 1, 2 and 4–6, by heat which may be caused by a fire, the gate and seat arrangement of this invention in the closed position will provide a metal to metal seal which will prevent feeding of the fire. With the sealing members destroyed, the gate member 30 will be moved downstream (right FIGURE 6) and the sealing surface 34 of the gate will engage the sealing surfaces 86 and 87 of the retainer portions of the seat 20 establishing a metal to metal seal. The downstream seat member 78 will be forced into engagement with the surface 76 of the recess 70 establishing a metal to metal seal. Obviously there would be a small amount of leakage through the valve because of the inefficiency of a metal to metal seal but the amount of leakage would not be sufficient to feed large quantities of volatile fluid to the fire.

From the foregoing, it will be seen that this invention is one well adapted to attain all of the objects hereinabove set forth, together with other advantages which are obvious and inherent from the description of the apparatus itself.

It will be understood that certain features and subcombinations are of utility and may be employed without reference to other features and subcombinations. This is contemplated by and is within the scope of the claim.

As many possible embodiments may be made of the invention without departing from the scope thereof, it is to be understood that all matter herein set forth or as shown in the accompanying drawings is to be interpreted as illustrative and not in a limiting sense.

I claim:

A gate valve having a valve body formed with flow passages, a valve chamber formed in the valve body and intersecting the flow passages, a gate member having parallel planar sealing surfaces and being disposed for movement within the valve chamber between open and closed positions, opposed seat recesses formed in said valve body about said flow passages, a seat assembly disposed in each of said seat recesses for sealing engagement with a parallel sealing surface of said gate member, each of said assemblies comprising an annular seat member movably received within the respective seat recess, said seat member having a first reduced diameter portion defining an annular abutment, an annular retainer member having an axial flange thereof press-fitted about said first reduced diameter portion with said axial flange in intimate engagement with said annular abutment, said seat member and retainer member each having annular planar sealing surfaces for sealing engagement with said gate and disposed in coplanar relation for distribution of the load applied by said gate to said seat assemblies, a second reduced diameter portion of said seat member cooperating with said retainer member to define an annular groove, an exterior lip formed on said seat member and an interior lip formed on said retainer, said lips being spaced defining a restricted annular opening for said groove, an annular face sealing member disposed within said groove and being of greater axial dimension than the axial dimension of said groove causing an annular sealing portion of said sealing member to protrude through said restricted opening and beyond said planar sealing surfaces for sealing engagement with said gate, said annular sealing member being slightly smaller in cross-sectional dimension than the cross-sectional dimension of said groove to allow for displacement of the protruding portion of said sealing member into said groove, said lips defining opposed internal frusto-conical surfaces of said groove which bear on said sealing member retaining the sealing member under compression within said groove for preventing excessive shifting of said sealing member in response to pressure and to maintain the sealing member in a centered position within the groove, said frusto-conical surfaces establishing sealing engagement with said sealing member to prevent fluid from entering said groove and getting behind said sealing member, a third reduced diameter portion defined on said seat member at the rear portion thereof and cooperating with said seat recess to define an annular chamber, back face sealing member disposed within said annular chamber and being of greater axial width than the axial width of said annular chamber causing said back face sealing member to be maintained under compression between said seat member and the bottom wall of said seat recess thereby maintaining sealing engagement between the seat assembly and the valve body.

References Cited by the Examiner

UNITED STATES PATENTS

| | | | |
|---|---|---|---|
| 2,674,436 | 4/1954 | Jones | 251—267 |
| 2,810,543 | 10/1957 | Bryant | 251—172 |
| 2,861,771 | 11/1958 | Bryant | 251—172 |
| 2,882,009 | 4/1959 | Bryant | 251—172 |
| 2,950,897 | 8/1960 | Bryant | 251—172 |

WILLIAM F. O'DEA, *Primary Examiner.*

CLARENCE R. GORDON, *Examiner*